United States Patent [19]

Tamaki

[11] 4,410,268

[45] Oct. 18, 1983

[54] APPARATUS FOR AUTOMATICALLY MEASURING THE CHARACTERISTICS OF AN OPTICAL SYSTEM

[75] Inventor: Hiroshi Tamaki, Tokyo, Japan

[73] Assignee: Tokyo Kogaku Kikai Kabushiki Kaisha, Japan

[21] Appl. No.: 257,271

[22] Filed: Apr. 24, 1981

[30] Foreign Application Priority Data

| Apr. 28, 1980 | [JP] | Japan | 55-56581 |
| May 29, 1980 | [JP] | Japan | 55-71736 |
| Jul. 31, 1980 | [JP] | Japan | 55-105513 |
| Mar. 3, 1981 | [JP] | Japan | 56-30222 |

[51] Int. Cl.³ .................................................. G01B 9/00
[52] U.S. Cl. ................................... 356/124; 356/125; 356/127
[58] Field of Search .................. 356/124, 125, 127

[56] References Cited

U.S. PATENT DOCUMENTS

| 1,241,612 | 10/1917 | Emerson | 356/127 |
| 3,832,066 | 8/1974 | Cornsweet | 356/125 |
| 3,880,525 | 4/1975 | Johnson | 356/127 |
| 4,139,305 | 2/1979 | Lapornik | 356/125 |
| 4,180,325 | 12/1979 | Humphrey | 356/127 |
| 4,281,926 | 8/1981 | Cornsweet | 356/124 |

*Primary Examiner*—Bruce Y. Arnold
*Attorney, Agent, or Firm*—Brumbaugh, Graves, Donohue & Raymond

[57] ABSTRACT

An apparatus for measuring the optical characteristics of an optical system includes a light source, a collimator lens, a mask, a detector, and a circuit for measuring information received from the detector. The light source projects a beam of light through the collimator lens and then through the optical system. The beam of light then passes through the mask, which has a pattern of at least two non-parallel, straight lines on it, and is projected onto the detector. With the information provided to the circuit by the detector the optical characteristics of the optical system are determined. The circuit determines the optical characteristics of the optical system by evaluating changes in the length and gradient angles of the lines projected onto the detector from the mask.

29 Claims, 39 Drawing Figures

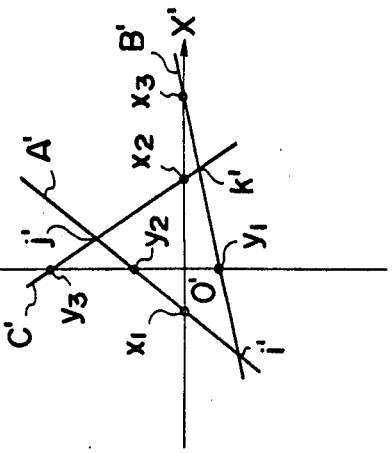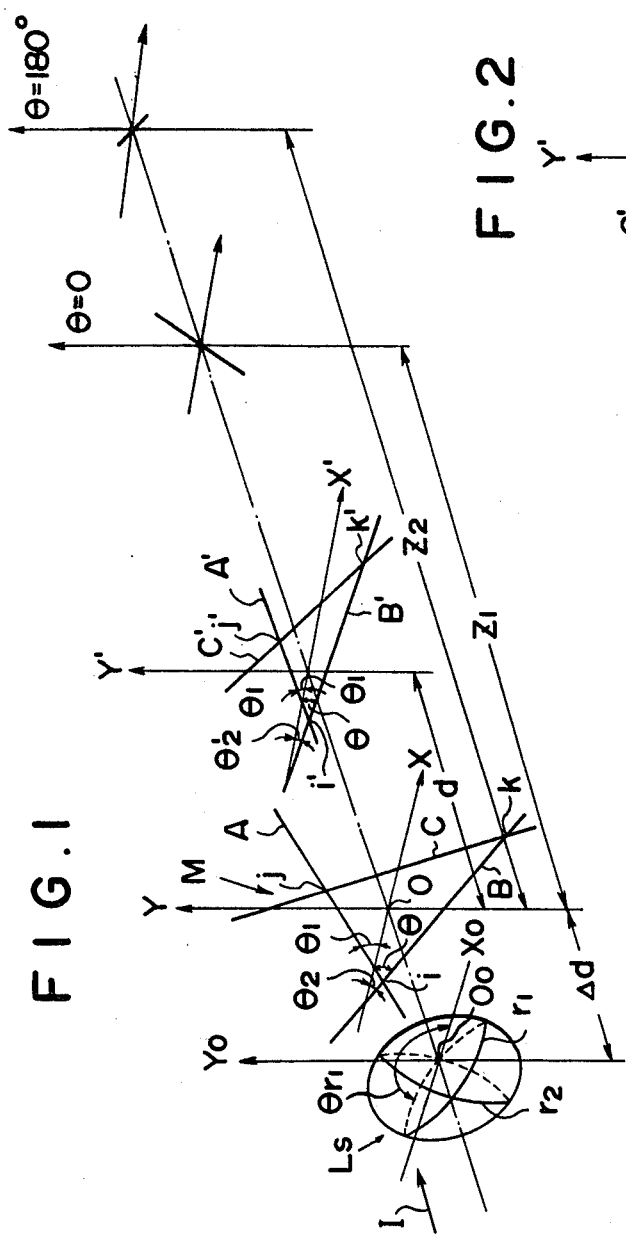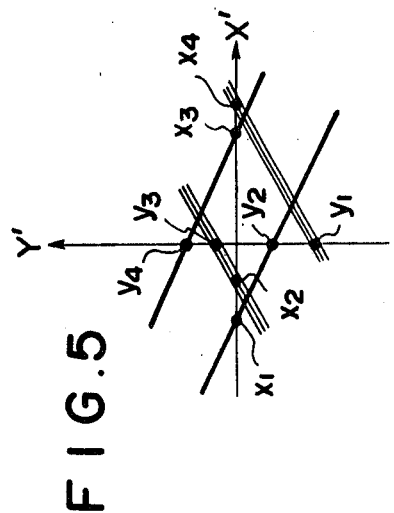

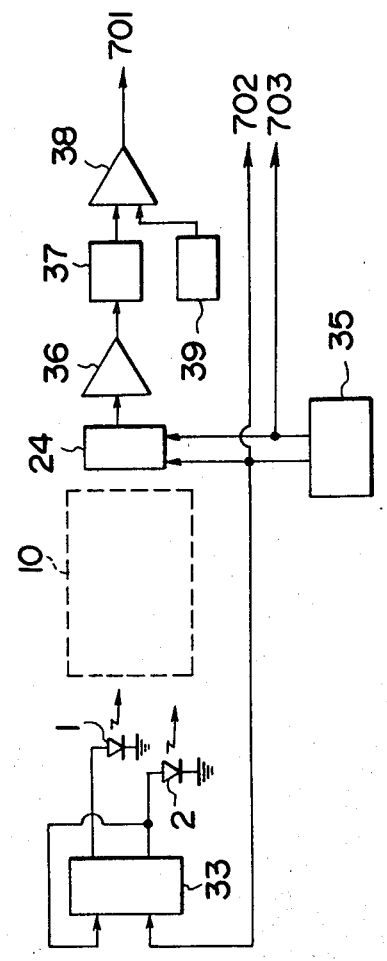
F I G. 6
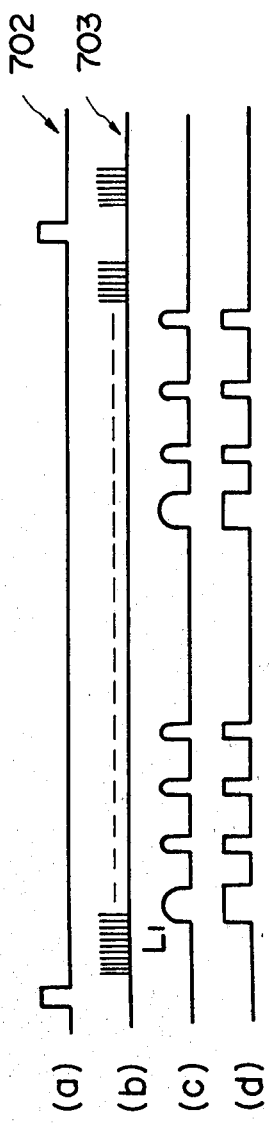
F I G. 7

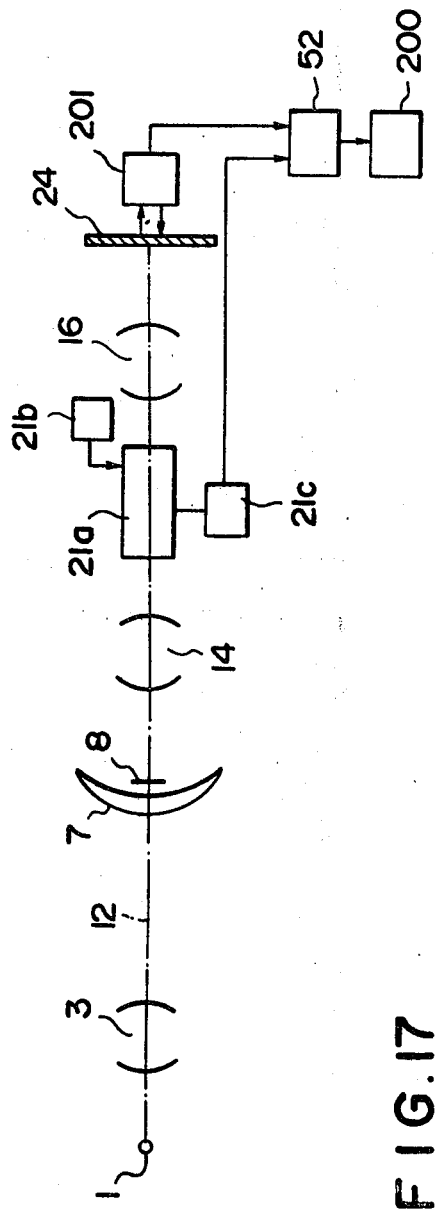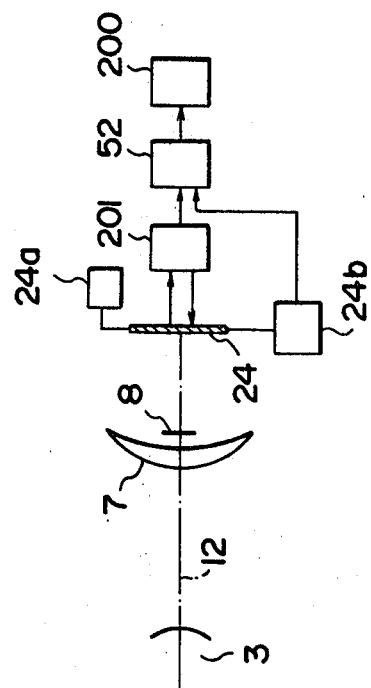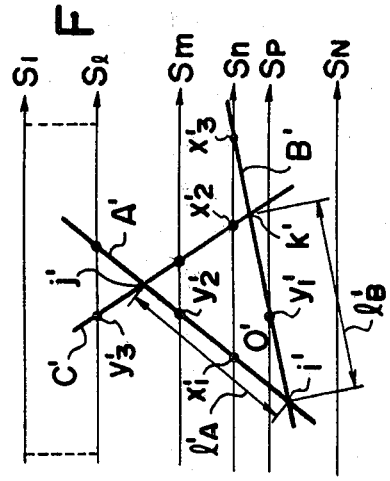

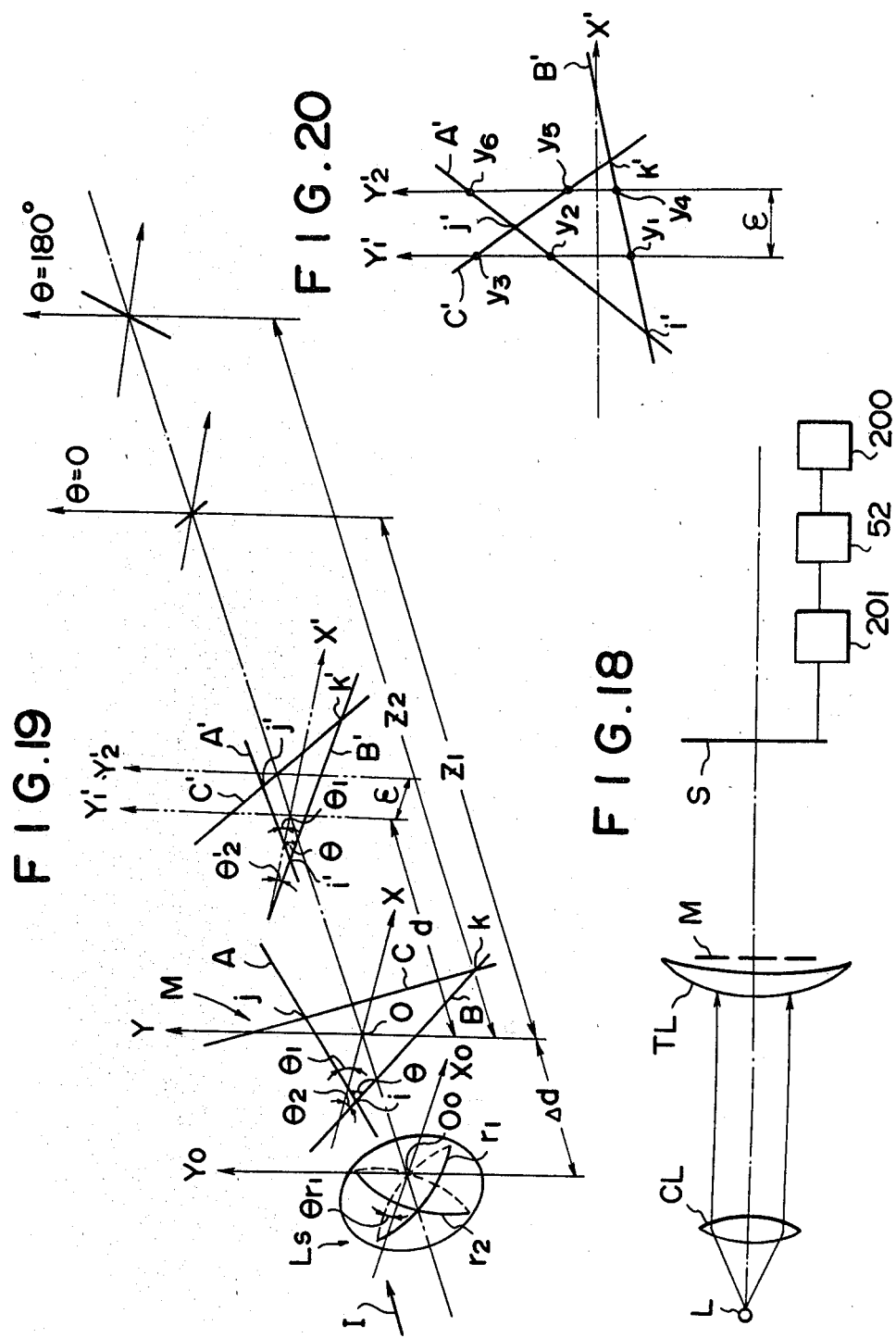

APPARATUS FOR AUTOMATICALLY MEASURING THE CHARACTERISTICS OF AN OPTICAL SYSTEM

The present invention relates to an apparatus for automatically measuring the characteristics of an optical system, such as the spherical refractive power, the cylindrical refractive power, the orientation of the cylinder axis, the prismatic refractive power, and the orientation of the prism base. The principle and the examples of the present invention will hereinafter be described mainly with respect to a measurement for such characteristics of a specific lens; however, this does not necessarily mean that the present invention is applicable only to a so-called lensmeter, which is adapted to measure the above characteristics of a spectacle lens, but the present invention is broadly applicable for measurements of the characteristics of lens optical systems used in optical instruments in general.

In recent years, various proposals have been made in the field of automatic lensmeters for automatically measuring the optical characteristics of a spectacle lens, such as the spherical refractive power, the cylindrical refractive power, the orientation of the cylinder axis and so on. For example, U.S. Pat. No. 3,880,525 discloses an apparatus in which a parallel light beam is projected through a lens along the optical axis of the apparatus, and the optical characteristics are determined by the deflection of the light which has passed through the lens. For this purpose, the apparatus includes a mask located behind the lens having small apertures which are offset from the optical axis of the lens and a detecting plane which is spaced apart by a predetermined distance along the optical axis from the mask so that the locations on the detecting plane of the projections of the apertures are detected. The locations thus detected are compared with the locations of the apertures on the mask to calculate the direction and the amount of deflection of the light beam which has passed through the lens. In order to obtain adequate information, the mask must be provided with at least three such apertures.

The apparatus as proposed by the above mentioned U.S. patent is considered as being disadvantageous in that the apparatus must be able to determine exactly which one of the projections on the detecting plane corresponds to each specific one of the apertures in the mask. Further, the apertures in the mask must be in two-dimensional arrangement so that the light beams which have passed through the apertures in the mask are not coplanar with each other. Thus, a two-dimensional scanning is required at the detecting plane, and the apparatus therefore becomes expensive as a whole. Complicated and expensive operation circuits are required because it is necessary to solve five simultaneous equations based on the information derived from the locations of at least three apertures.

In order to solve the problems that too much information has to be processed in to such two-dimensional detection, U.S. Pat. No. 4,180,325 discloses an apparatus that passes light beams from a mask through a rotatable disc having a special pattern comprised of transparent and opaque portions. The disc pattern functions to intermittently interrupt the light beams so that the light beams arrive at the detecting plane respectively at different timer, thereby eliminating the necessity for discriminating the light beams. However, in this apparatus, the pattern on the disc is very complicated, and the detection of the angular position of the disc is of significant importance. Therefore, serious problems are encountered in providing an accurate pattern on the disc and detecting the angular position of the disc.

It is therefore an object of the present invention to provide an apparatus for measuring the optical characteristics of an optical system in which detection and succeeding operation can relatively simply be performed.

Another object of the present invention is to provide an apparatus for measuring the optical characteristics of an optical system in which detections can be performed with one or more linear sensor arrays.

According to the present invention, the above and other objects can be accomplished by an apparatus for measuring optical characteristics of an optical system which comprises light source means for projecting a bundle of rays to the optical system, collimator means provided between the light source means and the optical system for providing a parallel pencil of rays from the bundle of rays, mask means located behind the optical system for selectively passing the rays which have passed through the optical system, detecting means spaced apart from the mask means by a predetermined distance along the optical axis of the apparatus, operation means for operating on information received from the detecting means to determine the optical characteristics. The mask means for a pattern comprised of at least two straight lines which are so arranged that they intersect with each other, or at least hypothetical extensions of them intersect with each other, i.e., the lines or line segments are nonparallel. Changes in the lengths and gradient angles of projections of the straight lines between the mask means and the detecting means are detected to determine optical characteristics of the optical system.

In one embodiment of the present invention, the pattern on the mask means includes at least three lines which intersect each other or at least hypothetical extensions of them intersect each other at least at three points. The detecting means includes linear sensor means corresponding to two perpendicularly intersecting axes. For this purpose, two linear sensor arrays may be arranged perpendicularly with each other. Alternatively, beam splitting means may be provided for dividing the bundles of rays which have passed through the mask means along two separated optical paths, and one of the optical paths may be provided with image rotating means for rotating the bundles of rays by 90° about the axis of the optical path. With this arrangement, it becomes possible to perform detection operation along two perpendicular axes by means of only one linear sensor array. In this instance, in order to make it easy to distinguish the bundles of rays along the two optical paths from each other, it is advisable to provide two light sources of different wave-lengths so that the light of one wave-length is led along one optical path and the light of the other wave-length along the other path. Means such a chopper may then be provided so that the rays along the two optical paths are alternately led to the sensor.

Where the light from the optical system such as a lens is passed through the mask having a pattern comprised of at least three mutually intersecting straight lines, the projection of the pattern is deflected in accordance with the refractive characteristics of the optical system. More specifically, in case of a lens having a spherical refractive power, the projection of the pattern does not produce any change in the intersecting angles among the straight lines, but there are changes in the lengths between intersections. Such changes in lengths correspond to the refractive power of the lens. Where the lens has a cylindrical refractive power, the pattern of the straight lines is projected with changes not only in the lengths between the intersections but also the angles of intersections. The projected pattern is detected by linear sensor means in terms of changes in positions of intersections between the projected straight lines and the sensor means. It is therefore possible to determine the optical characteristics of the optical system by detecting such positions of the projected straight lines along two perpendicular axes and performing appropriate operations.

In another embodiment of the present invention, the mask means has a pattern of at least two straight lines which are arranged so that they or hypothetical extensions of them intersect with each other, and the detecting means includes a linear sensor array perpendicular to the optical axis. Means are provided for rotating the projection of the pattern on the mask means and the linear sensor with respect to each other about the optical axis. For this purpose, the linear sensor array may be rotated or an image rotating optical element may be provided in the optical path.

In a further embodiment of the present invention, the mask means includes a pattern comprised of at least two straight lines, and the detecting means includes a two-dimensional sensor arranged perpendicularly to the optical axis of the optical system. Thus, the configuration of the projected pattern is directly detected by the sensor and it is not required to adopt complicated arrangements as in the previously discussed U.S. patents.

In a further embodiment of the present invention, the mask pattern comprises at least three non-parallel straight lines which intersect at least at hypothetical extensions thereof, and the detecting means include at least two linear sensor arrays perpendicular to the optical axis and intersecting obliquely with each other.

The above and other objects and features of the present invention will become apparent from the following descriptions of preferred embodiments taking reference to the accompanying drawings, in which:

FIG. 1 is a perspective view for explaining the principle of the present invention;

FIG. 2 is a view showing one example of the projected mask pattern at the detecting plane;

FIG. 5 is an example of the projection of the mask pattern shown in FIG. 4a;

FIG. 6 is a block diagram of the detecting section used in the lensmeter;

FIG. 7 shows detecting pulse signals;

FIG. 15 is a diagrammatical view of a lensmeter in accordance with another embodiment of the present invention;

FIG. 16 is a diagrammatical view similar to FIG. 15 but showing a further embodiment of the present invention;

FIG. 17 is a view showing the manner of two dimensional scanning in the detecting plane;

FIG. 18 is a diagrammatical view of a lensmeter embodying the principle shown in FIG. 17;

FIG. 19 is a perspective view showing the principle of a further aspect of the present invention;

FIG. 20 is a view showing a projected mask pattern;

Figure 31:
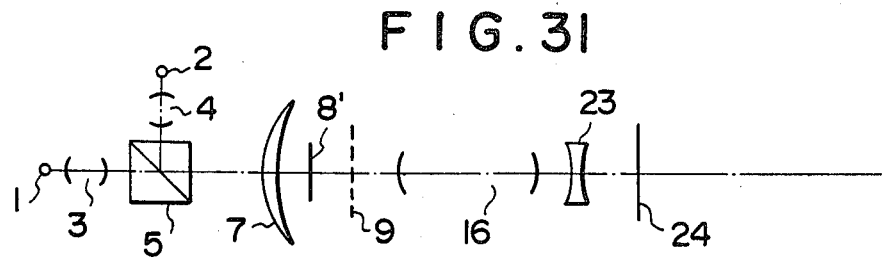
Figure 32:
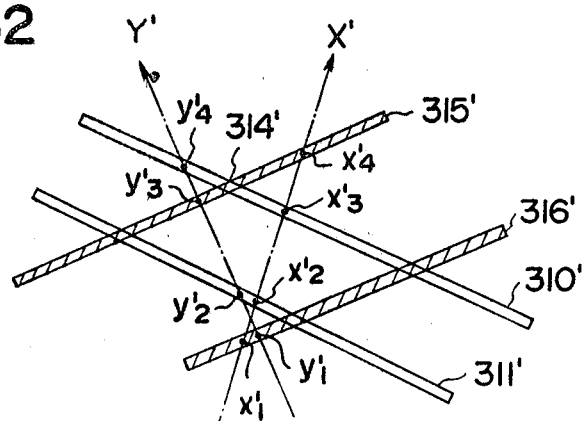
Figure 33:
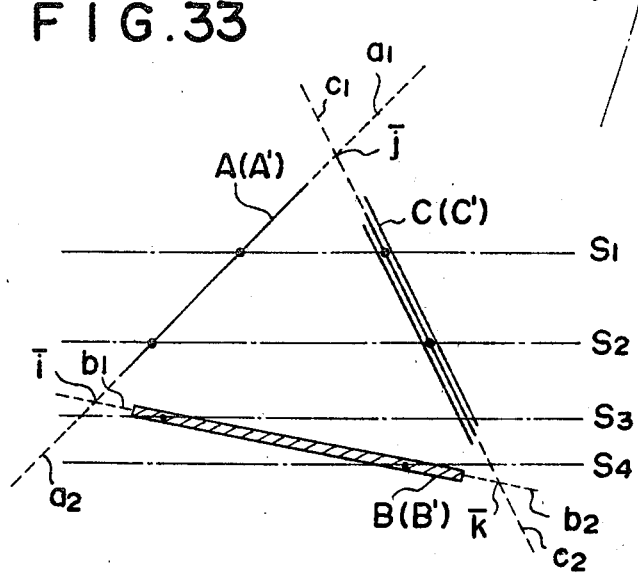
Figure 34:
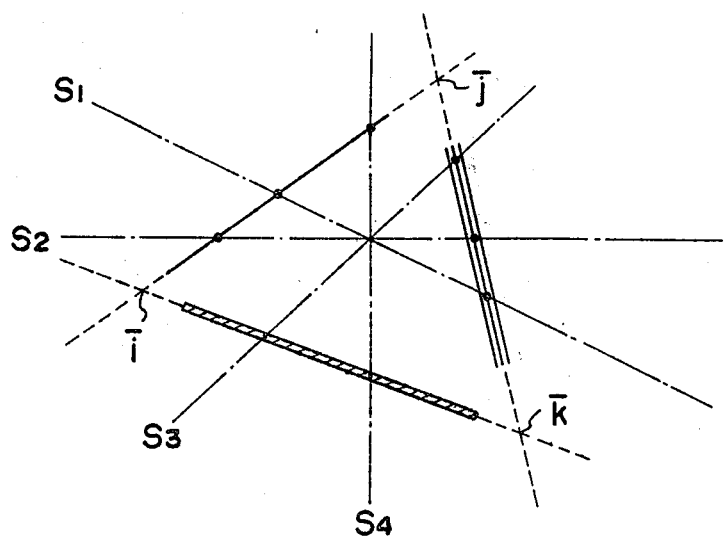

FIGS. 30 (a) through (f) show an example of a mask pattern having a wavelength selective property;

FIG. 31 is a diagrammatical view showing a still further embodiment of the present invention;

FIG. 32 shows a projected mask pattern; and,

FIGS. 33 and 34 show further examples of a mask pattern.

Referring now to the drawings, particularly to FIG. 1, there is shown a lensmeter wherein a lens $L_s$ to be tested in located in a plane having a perpendicular coordinate $X_o$-$Y_o$. The lens $L_s$ has a first axis of principal meridians $r_1$ and a second axis of principal meridians $r_2$ are is located with its optical center $O_o$ on the origin of the coordinate. In FIG. 1, the first axis $r_1$ is inclined by an angle $\theta r_1$ with respect to the $X_o$ axis. Along the optical axis of the lens $L_s$, there is a plane having a perpendicular coordinate X-Y, which is apart from the plane $X_o$-$Y_o$ by a distance $\Delta d$. In the X-Y plane, there is a mask M which has a pattern comprised of three straight lines A, B and C which intersect with each other. The intersection between the lines A and B is designated by the reference i, the one between the lines A and C by j, and the one between the lines B and C by k. The line A has an angle $\theta_1$ with respect to the X-axis. Similarly, the line B has an angle $\theta_2$ with respect to the X-axis. The line segment ij has a length $l_A$ and the line segment ik has a length $l_B$.

There is a detecting plane having a coordinate X'-Y' and apart from the plane X-Y by a distance d along the optical axis. In the detecting plane X'-Y', the lines A, B and C on the plane X-Y form images A', B' and C' having intersections i', j' and k' respectively corresponding to the intersections i, j and k. The projected lines A' and B' make angles $\theta_1'$ and $\theta_2'$ with respect to the X' axis and the line segments i'j' and i'k' have lengths $l_A'$ and $l_B'$ respectively. Representing tan $\theta_1$, tan $\theta_2$, tan $\theta_1'$ and tan $\theta_2'$ by $m_A$, $m_B$, $m_A'$ and $m_B'$, respectively, the refractive power of the lens $L_s$ is represented by the following equation $$\phi_A \cdot \phi_B(m_A - m_B)\left(\frac{d}{z} + 1\right)^2 - [\phi_A(m_A - m'_B) + \phi_B(m'_A - m_B)]\left(\frac{d}{z} + 1\right) + (m'_A - m'_B) = 0 \quad (1)$$

where: $\phi_A = \dfrac{l_A}{l'_A}\sqrt{\dfrac{m'_A{}^2 + 1}{m_A{}^2 + 1}}$ $\phi_B = \dfrac{l_B}{l'_B}\sqrt{\dfrac{m'_B{}^2 + 1}{m_B{}^2 + 1}}$ The equation gives roots $1/z_1$ and $1/z_2$ and the value $z_1$ and $z_2$ corresponds to the distances between the mask plane X-Y and the first and second focal points where the angle between the images of the lines A and B becomes 0° or 180°. The vertex refractive power $1/fr_1$ and $1/fr_2$ of the lens $L_s$ can be represented as functions of the distance $\Delta d$ between the lens $L_s$ and the mask M as follows.

$$1/fr_1 = \frac{1/z_1}{\Delta d/z_1 - 1} \quad (2)$$

$$1/fr_2 = \frac{1/z_2}{\Delta d/z_2 - 1} \quad (3)$$

The angle $\theta r_1$ between the cylinder axis and the X-axis can be represented by the following equations.

$$\theta r_2 = \theta r_1 + 90° \quad (4)$$

$$\theta r_1 = \tan^{-1}\left[\frac{m_A \cdot \phi_A \cdot \left(1 + \frac{d}{z_1}\right) - m'_A}{\phi_A\left(1 + \frac{d}{z_1}\right) - 1}\right] \quad (5)$$

$$\theta r_1 = \theta r_2 + 90° \quad (6)$$

$$\theta r_2 = \tan^{-1}\left[\frac{m_A \cdot \phi_A\left(1 + \frac{d}{z_2}\right) - m'_A}{\phi_A\left(1 + \frac{d}{z_2}\right) - 1}\right] \quad (7)$$

In accordance with one aspect of the present invention, the refractive power of the lens $L_s$ from the intersections of the projected image A', B' and C' with the X' and Y' axes through operations based on the aforementioned equations. More specifically, referring to FIG. 2, the projected lines intersect with the X'-axis at the points $x_1$, $x_2$ and $x_3$ and with the Y'-axis at the points $y_1$, $y_2$ and $y_3$. It will therefore be understood that the equation for the line A' can be obtained by the points $x_1$ and $y_2$. Further, the equations for the lines B' and C' can respectively be obtained from the points $x_3$ and $y_1$ and $x_2$ and $y_3$. Based on the equations of the lines, it is possible to determine the line segments $l_A'$ and $l_B'$ and the gradients $m_A'$ and $m_B'$, and therefore the locations of the points of intersections i', j' and k'. In order to distinguish the lines A', B' and C', the lines A, B and C on the mask M may be of different widths or one or two of the lines may be substituted by groups of parallel lines. For example, the line A may be substituted by two or three parallel lines and the line B by 2 different number of parallel lines.

Preferably, the pattern on the mask M is composed of two pairs of parallel lines or line groups, said pairs intersecting perpendicularly with each other. Where the intersections of the lines fall on the axes of the coordinates, it may be difficult to determine the central axes of the lines. This problem will be solved by interrupting one of the lines at the intersection of two lines so that appropriate spaces are provided between the lines.

For determining the prism power by a mask pattern comprised of three straight lines, one of the intersections may be located on the origin of the coordinates, that is, on the optical axis, and the location of the corresponding point is detected on the detecting plane. Where the mask pattern includes two perpendicularly intersecting pairs of parallel lines forming a rectangular configuration, the amount of deflection of the intersection between the diagonal lines of the rectangle may be calculated.

Figure 3:
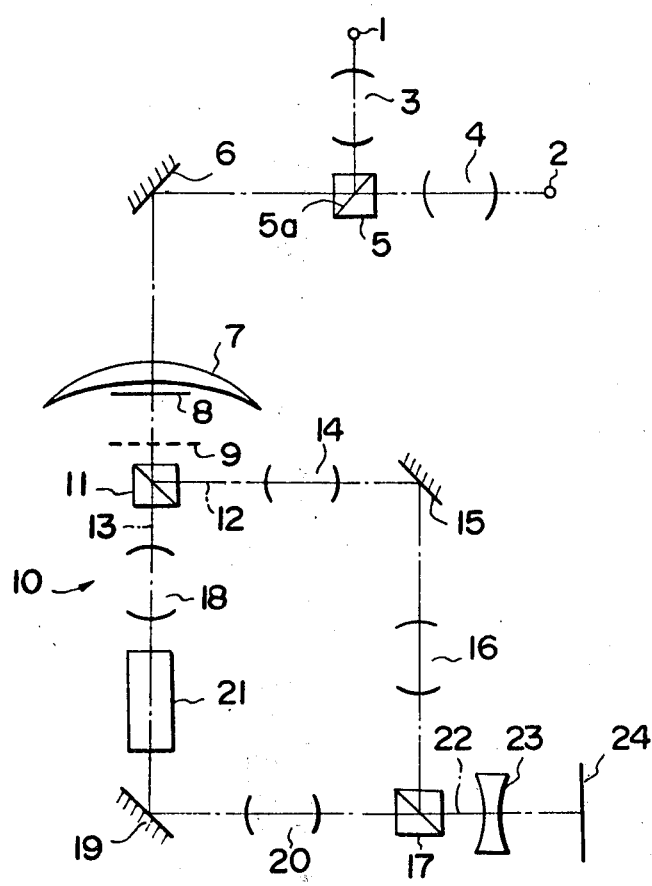
FIG. 3 is a diagrammatical view showing a lensmeter in accordance with one embodiment of the present invention.

Referring now to FIG. 3, there is shown a lensmeter which comprises a pair of light emitting diodes 1 and 2 which generate light beams of different wavelengths. The light beams from the diodes 1 and 2 are passed respectively through collimator lenses 3 and 4 to a beam splitter 5 which has a wavelength selective property. Thus, the beam splitter 5 has a reflecting surface 5a which reflects toward a mirror 6 only such portion of the light from the diode 1 that has a specific wavelength and allows to pass toward the mirror 6 only such portion of the light from the diode 2 that has another specific wavelength. Along the path of the light reflected by the mirror 6, there is located a lens 7 to be tested. Behind the lens 7, there are a makes plate 8 and a detecting plane 9 which are located at predetermined distances from the lens 7.

In order to make it possible to perform a detection at the detecting plane 9, there is provided a relay system 10 which includes a beam splitter 11 having the same wavelength-selective property as the beam splitter 5. More precisely, the beam splitter 11 functions to reflect the light from the diode 1 along an optical path 12 and to pass the light from the diode 2 along an optical path 13. In the optical path 12, there are provided a relay lens 14, a mirror 15 and a relay lens 16 and the light from the lens 16 is directed to a beam splitter 17, which has the same wavelength selective property as the beam splitter 11.

In the optical path 13, there are provided a relay lens 18, a mirror 19 and a relay lens 20, and the light from the relay lens 20 is directed to the beam splitter 17. Between the relay lens 18 and the mirror 19, there is an image rotator 21 of a known construction so that the image projected along the optical path 13 is rotated by 90° about the optical axis. The light beams which have been directed along the optical paths 12 and 13 into the beam splitter 17 are both directed along an optical path 22.

Along the optical path 22, there are provided a negative power lens 23 and a linear sensor 24. The negative power lens 23 is provided for preventing the mask pattern image on the sensor 24 from becoming too small even in case where the lens 7 is of a very strong positive power. The linear sensor array 24 is located at a position conjugate with the detecting surface 9.

Figure 4:
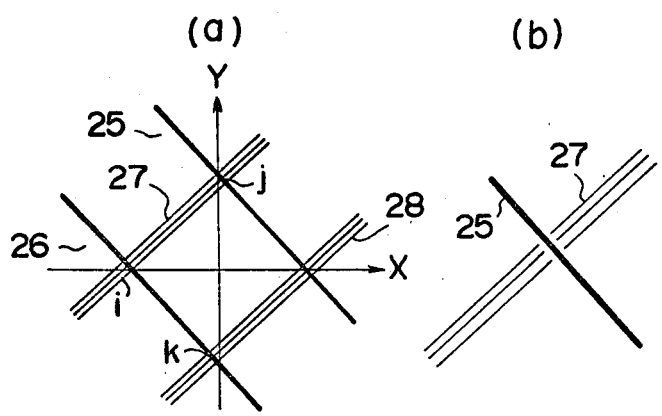
FIG. 4a shows an example of the mask pattern.
FIG. 4b is an enlarged view showing an intersection of straight lines in the mask pattern.

Referring to FIG. 4a, there is shown a pattern formed on the mask plate 8. The pattern includes a first pair of parallel straight lines 25 and 26 and a second pair of parallel groups of straight lines 27 and 28. Each of the line groups 27 and 28 comprises three relatively thin lines whereas the lines 25 and 26 in the first pair are relatively thick. As shown in FIG. 4b, the group 27 of the thin lines is interrupted at the intersection with the thick line 25. In a similar manner, the thin lines 28 are also interrupted at the other intersections. The pattern may be such that the lines are transparent and the base of the mask 8 is opaque, or the lines are opaque and the base of the mask 8 is transparent.

The parallel bundle of rays projected to the lens 7 is passed through the lens 7 and the transparent portion of the mask plate 8 to the relay system 10. The rays are deflected in accordance with the refractive power of the lens 7 and passed through the relay system 10 to the linear sensor array 24. On the image plane containing the linear sensor array 24, an image of the mask pattern is formed, for example, as shown in FIG. 5. The images of individual lines of the pattern are detected by the linear sensor array 24 at the intersections $x_1$, $x_2$, $x_3$ and $x_4$ and $y_1$, $y_2$, $y_3$ and $y_4$ with the X' and Y' axes. Through appropriate operations, it is therefore possible to obtain the refractive power of the lens 7. In the illustrated embodiment, the diodes 1 and 2 are alternately energized and the light from the diode 1 is passed through the optical paths 12 and 22 to the sensor 24 so that the intersections with the X-axis are detected, whereas the light from the diode 2 is passed through the optical path 13 having an image rotator 21 and then through the optical path 22 to the sensor 24 so that the intersections with the Y-axis are detected.

Referring now to FIG. 6, it will be noted that the diodes 1 and 2 are connected with a flip-flop 33 for driving them. The flip-flop 33 is actuated by a scan start pulse which is applied thereto from a driving circuit 35. The linear sensor array 24 may be comprised of a charge-coupled device, CCD, which may for example have 1728 elements. The output of the linear sensor array 24 is connected with an amplifier 36 which is in turn connected with a sample-hold circuit 37. The output of the sample-hold circuit 37 is applied to a comparator 38 and compared with a reference value applied by a reference signal circuit 39 to thereby produce a binary signal 701. The driving circuit 35 produces scan start pulses 702 and clock pulses 703 which are applied to the sensor 24. In FIG. 7, the scan start pulses 702, the clock pulses 703, the output pules of the sample-hold circuit 37 and the output of the comparator 38 are respectively shown in (a), (b), (c) and (d).

Figure 8:
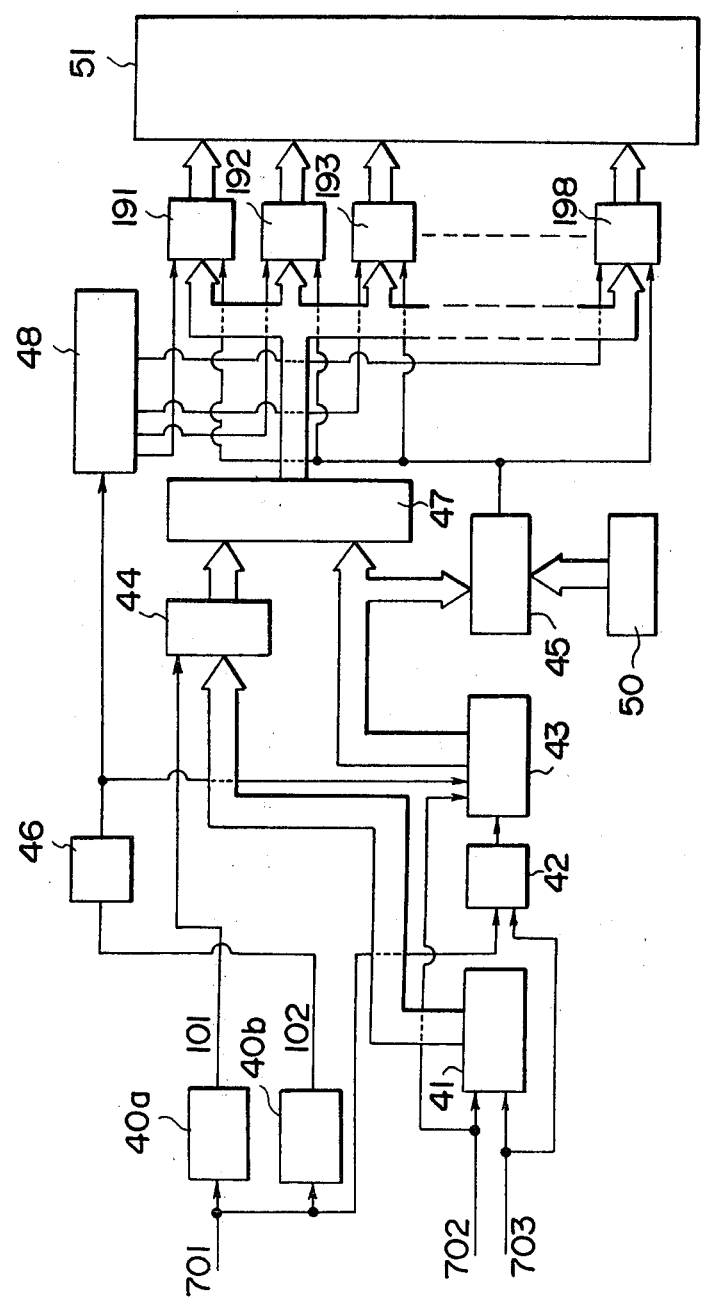
FIG. 8 is a block diagram of the signal processing section.

In the aforementioned arrangement, it is possible to detect the position of the image of each straight line on the sensor 24 while a scan is made along the sensor 24. For this purpose, detection may be made of a specific element in the sensor 24 on which the center of an output pulse having a duration which corresponds to the width of the straight line. For example, a number of the clock pulses may be counted in each output pulse between the start and end thereof to determine the center thereof. FIG. 8 shows a circuit provided for the purpose.

Referring to FIG. 8, the output 701 of the comparator 38 is connected with a pulse start detector 40a and a pulse end detector 40b whereas the scan start pulse 702 and the clock pulse 703 are applied to a counter 41. The counter 41 is so connected that it is cleared by the scan start pulse 702 and starts to count the clock pulse 703. The output of the counter 41 is connected with a latch circuit 44 which functions to latch the output of the counter 41 when an output 101 is applied thereto from the pulse start detector 40a. At this instance, the output of the latch circuit 44 represents the location on the sensor 24 of the leading edge of the pulse L1 shown in FIG. 7.

Figure 9:
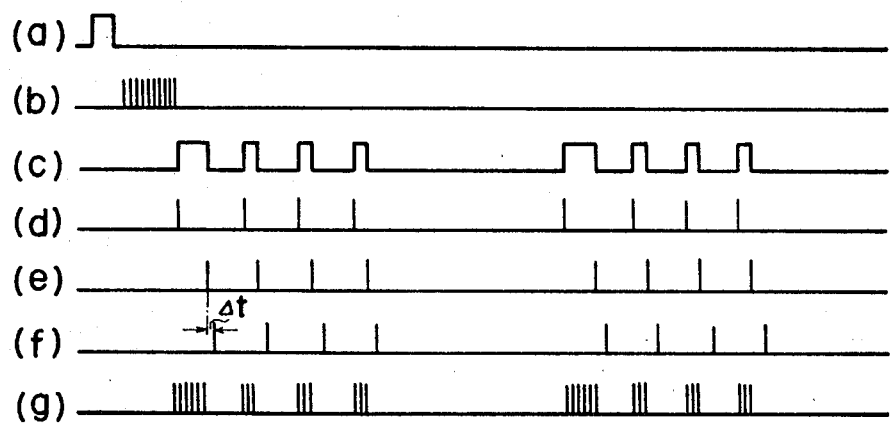
FIG. 9 shows various signal pulses in the processing section.

A gate circuit 42 is provided so as to receive outputs 701 and 703. The gate circuit 42 functions to apply the clock pulse to a counter 43 which is in advance cleared by the scan start pulse 702, when the output 701 is binary "1", as shown by g in FIG. 9. It will therefore be understood that the output of the counter 43 corresponds to the width of the projection on the sensor 24. It is readily possible to determine the location of the center of the projection on the sensor 24 from the output of the counter 43.

Figure 10:
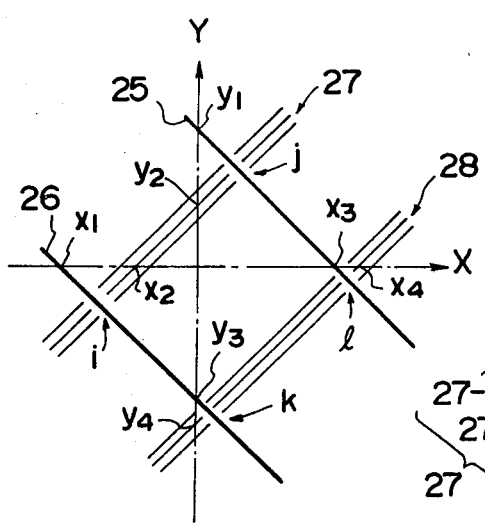
FIG. 10 shows the projected pattern for explaining the scanning by the sensors.

The output 102 of the pulse end detector 40b is connected with a time delay circuit 46 which functions to apply to the output 102 a time delay of Δt as shown in FIG. 9(f). The output of the time delay circuit 46 is applied to the counter decoder 48 which functions to sequentially latch at latches 191 through 198 the output of an adder 47 which is connected with the outputs of the latch circuit 44 and the counter 43. Further, the output of the time delay circuit 46 is also applied to the counter 43 for resetting the same. In the circuit described above, at the end of a scan on the sensor 24 (FIG. 6), the latch 191 stores the location of the center of the first projection on the sensor 24 and the latch 192 stores the location of the center of the second projection. For example, supposing that the sensor 24 performs a scan along the Y-axis in FIG. 10, the sensor 24 produces signals corresponding to eight lines intersecting the Y-axis, as shown in FIG. 7(c). The eight latches 191 through 198 are adapted to correspond respectively to these signals.

Referring further to FIG. 8, it will be noted that there is provided a digital comparator 45 which functions to compare the output of the counter 43 with a reference value applied by a reference circuit 50. The comparator 45 is provided for discriminating the signals corresponding to thick lines from the signals corresponding to thin lines. The output of the comparator 45 is applied to the latches 191 through 198. Thus, the output from each of the latches 191 through 198 contains information with respect to the location of the center of the corresponding projection and the width of the projection. The outputs of the latches 191 through 198 are connected with a judging circuit 51.

Figure 11:
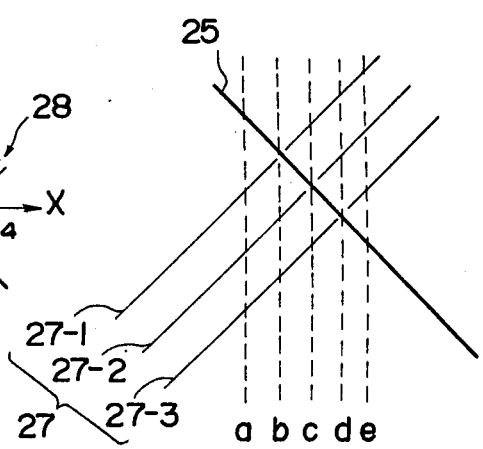
FIG. 11 shows a manner of detection at a section of the straight lines.

The specific mask pattern comprised of the thick and thin lines is intended to make it easy to discriminate one line from the others. Referring specifically to FIG. 11, where the sensor 24 is performing a scan along the line a or e, it is readily possible to detect the center of the thick line 25 and also to judge the center of the central line 27-2 of the line group 27 as the location of the line groups 27. Where the scan is made along the line b, the sensor 24 produces outputs corresponding to the lines 25, 27-2 and 27-3. Along the line c, the outputs of the sensor 24 correspond to the lines 27-1, 25 and 27-3, but along the line d, they correspond to the lines 27-1, 27-2 and 25. When only two thin lines are thus projected on the sensor 24, the location of each line or line group can be determined by the following procedures.

(1) The location of the thick line is determined at all times by the location of the center of the sensor output corresponding to the thick line.

(2) When the output signals are in the order of thick-thin-thin, the center of the first thin signal is judged as the location of the thin line group.

(3) When the output signals are in the order of thin-thick-thin, the center between the two thin lines is judged as the location of the thin line group.

(4) When the output signals are in the order of thin-thin-thick, the center of the second thin line is judged as the center of the thin line group.

The judging circuit 51 in FIG. 8 performs the above procedures. The circuit 51 may be in the form of a random logic circuit; however, in a preferable arrangement, the judgement and succeeding data processing should be performed in a microprocessor. It would be very obvious to those skilled in the art to perform the aforementioned procedure by a microprocessor. It should of course be noted that the above procedures can be applied in a same manner to all intersections of the thick line and the thin line group. It is further possible to divide the linear sensor into two sections, one for scanning along the X-axis and the other for the Y-axis.

Figure 12:
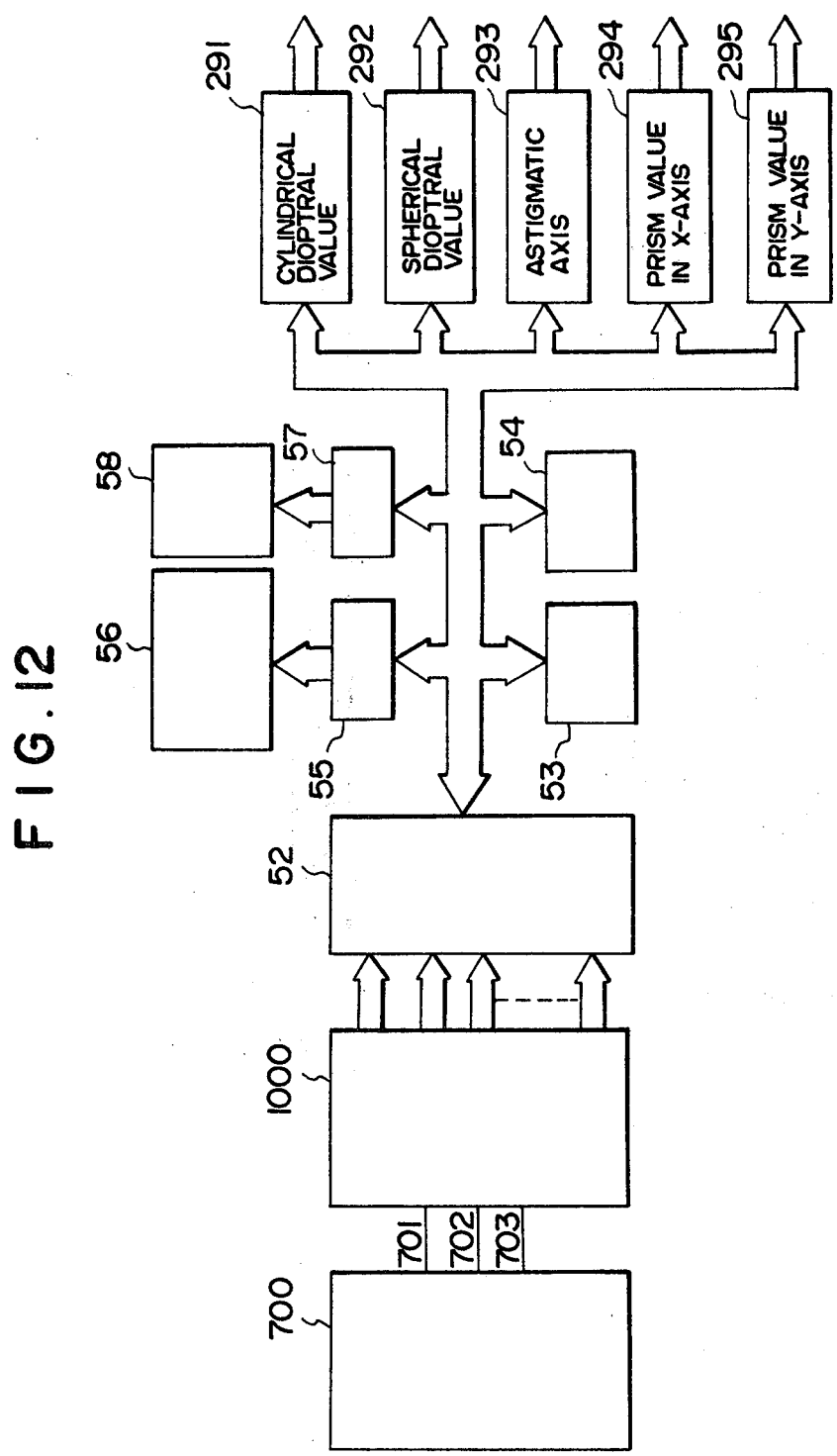
FIG. 12 is a block diagram showing the electric system as a whole.

FIG. 12 shows a general arrangement of a data processing circuit which is designed for the lensmeter in accordance with one embodiment of the present invention. In FIG. 12, the block 700 includes the optical system shown in FIG. 3 and the circuit shown in FIG. 6, whereas the block 1000 designates the circuit shown in FIG. 8. The outputs of the circuit 1000 represent the locations of the projections on the linear sensor array 24 of the respective lines and line groups and are applied to a microprocessor 52.

The microprocessor 52 is operative with a data memory section 53, a program memory section 54, an indicator interface section 55, a printer interface section 57 and output registers 291 through 295 which output the results of the operations by the microprocessor. As soon as the locations $y_1$, $y_2$, $y_3$ and $y_4$ are obtained through the first scan, the light source is switched to the other diode for the next scan so that the optical path is also switched from one to the other so that the scan is made along the X-axis to thereby obtain the locations $x_1$, $x_2$, $x_3$ and $x_4$.

Based on the locations of the projected straight lines on the sensor 24, the optical characteristics of the lens are obtained by the following operations.

(i) Obtain the equations of the lines 25 and 26 and the line groups 27 and 28 to thereby determine the gradients $m_A'$ and $m_B'$ of the line group 27 and the line 26.

(ii) Calculate the length of the segment of the line group 27 between the lines 25 and 26 to determine the length $l_A'$ of the segment.

(iii) Calculate the length of the segment of the line 26 between the line groups 27 and 28 to determine the length $l_B'$.

(iv) Calculate the prism power $P_H$ along the X-axis and the prism power $P_V$ along the Y-axis in accordance with the following equations:

$$P_H = \frac{x_i + x_l}{2_d} \times 100 \tag{8}$$

$$P_V = \frac{y_j + y_k}{2_d} \times 100 \tag{9}$$

where: $x_i$ and $x_l$ are locations along the X-axis of the intersections i and l, and $y_j$ and $y_k$ are locations of the intersections j and k in FIG. 10.

(v) Obtain desired optical characteristics through operations based on the previously described equations.

The results thus obtained are indicated in the indicator 56, the printer 56 and the output registers 291 through 295 in terms of a cylindrical dioptry, a spherical dioptry, orientations of the cylinder axes and the prism powers. It is, of course, possible to display the prism powers and the cylinder axes in two-dimensional patterns by using a two-dimensional display device such as a CRT-display. With this kind of display, it becomes possible to establish readily and quickly an alignment between the lens to be tested and the lensmeter.

Figure 14:
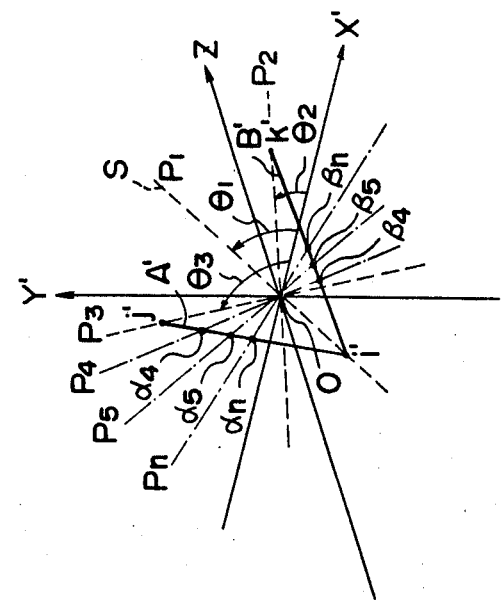
FIG. 14 is a front view showing the principle of detection by linear sensor arrays.
Figure 13:
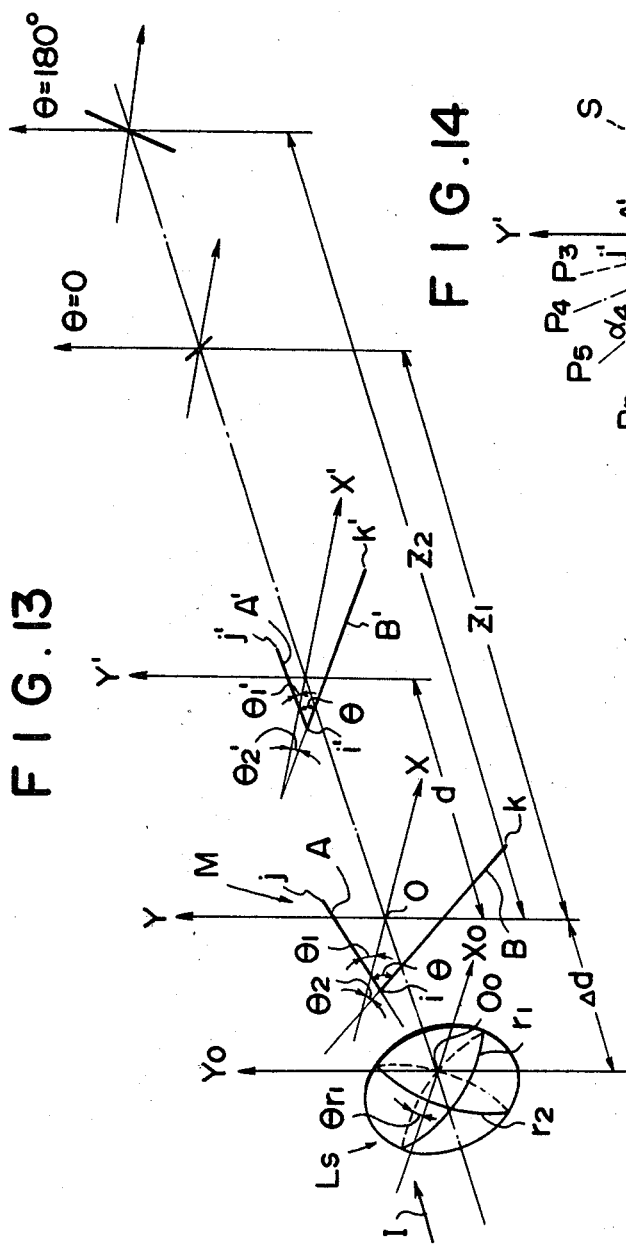
FIG. 13 is a perspective view of another lensmeter for explaining the principle of another aspect of the present invention.

Referring now to FIGS. 13 and 14, the principle in accordance with another aspect of the present invention is shown. In FIG. 13, corresponding parts are shown by the same reference numerals as in FIG. 1 so that detailed descriptions will not be repeated. Referring to FIG. 14, a linear sensor array S is arranged in the detecting plane X'-Y' for rotation about the origin O of the coordinates X'-Y'. In the position $P_1$, the sensor S detects the intersection i' between the lines A' and B', whereas in the position $P_2$, the end of the line B' is detected. Similarly, in the position $P_3$, the end of the line A' is detected. In the positions $P_4$ through $P_n$, the points $\alpha_4$ through $\alpha_n$ on the line A' and the points $\beta_4$ through $\beta_n$ are respectively detected. Based on the detection signals of the sensor S, it is possible to obtain the equations and the lengths of the projected lines. The pattern on the mask M may of course be comprised of three or more lines as in the previous embodiment.

Referring to FIG. 15, the lensmeter shown therein includes a light emitting diode 1 for producing a light which is passed through a collimator lens 3. The parallel bundle of rays from the collimator lens 3 is passed along an optical axis 12 through a test lens 7 which is located with the optical center aligned with the optical axis 12. Behind the lens 7, there is provided a mask plate 8 having a pattern of straight lines. The beam of rays which has passed through the lens 7 and the mask plate 8 further pass along the optical axis 12 through a relay lens 14 and an image rotator 21a and then through a relay lens 16 to a linear sensor array 24. The image rotator 21a is arranged so as to be continuously driven by a motor 21b and associated with a rotation angle detector 21c. The output of the linear sensor array 24 is applied to an amplifier 201 of which output is connected with an operating circuit 52. The operating circuit 52 receives a rotation angle signal from the detector 21c and performs appropriate operations in accordance with the aforementioned equations to thereby determine the optical characteristics of the lens 7. The results are indicated in an indicating device 200.

In the embodiment shown in FIG. 16, the linear sensor array 24 is driven continuously by a motor 24a. A rotation angle detector 24b is associated with the linear sensor array 24 so as to produce a rotation angle sensor which is applied to the operating circuit 52. The function of this embodiment is substantially the same as in the embodiment shown in FIG. 15.

Referring to FIG. 17, the mask M has a pattern comprised of a plurality of mutually intersecting straight lines. The projected pattern of straight lines A', B' and C' is scanned as shown by $S_1$ through $S_N$ to detect the locations of any appropriate points of the line images A', B' and C' so that the equations of the respective lines can be determined from each two points on each line. In the specific example shown in FIG. 17, the point $y_3'$ on the line C' can be determined by the scan $S_l$. Similarly, the point $y_2'$ on the line A' can be determined by the scan $S_m$. In the same manner, the locations of the points $x_1'$, $x_2'$, $x_3'$ $y_1'$ can be determined. The points $x_1'$ and $y_2'$ determine the equation of the straight line A' whereas the points $x_3'$ and $y_1'$ and the points $x_2'$ and $y_3'$ respectively, determine the equations of the lines B' and C'. Based on the equations of the lines A', B' and C', it is possible to obtain the lengths $l_A'$ and $l_B'$ of the segments of the lines A' and B' and the gradients $m_A'$ and $m_B'$ of the lines A' and B'. It is further possible to determine the locations of the intersections i', j' and k'.

The output of the sensor S is applied to an amplifier 201 which is connected with an operating circuit 52. The results of the operations in the circuit 52 are indicated in the indicating device 200 as shown in FIG. 18.

Referring now to FIG. 19, there is shown an example wherein detection is performed along two parallel lines. In FIG. 19, corresponding parts are designated by the same reference characters as in FIG. 1. The test lens Ls is located in a plane having perpendicularly intersecting coordinate axes $X_o$-$Y_o$. The mask is located in a plane having X and Y axes. In the detecting plane, there are coordinate axes $X'$-$Y_1'$. A second vertical axis $Y_2'$ provided with a distance $\delta$ from the first vertical axis $Y_1'$.

Referring to FIG. 20, it will be noted that the projected pattern of lines intersects with the $Y_1'$-axis at the points $y_1$, $y_2$ and $y_3$ and with the $Y_2'$-axis at the points $y_4$, $y_5$ and $y_6$. The equation of the line A' can therefore be determined by the locations of the points $y_2$ and $y_6$. Similarly, the equations of the lines B' and C' can respectively be determined by the locations of the points $y_1$ and $y_4$ and of the points $y_3$ and $y_5$. Based on the equations of the lines, it is possible to obtain the lengths of the line segments $l_A'$ and $l_B'$ and the gradients $m_A'$ and $m_B'$. It is further possible to determine the locations of the intersections i', j' and k'. For obtaining the prism power, the mask pattern may be located in the X-Y plane so that the locations of the intersections i, j and k meet the requirements $x_i + x_j + x_k = 0$ and $y_i + y_j + y_k = 0$ and determine the locations of the corresponding points on the detecting plane.

Figure 21:
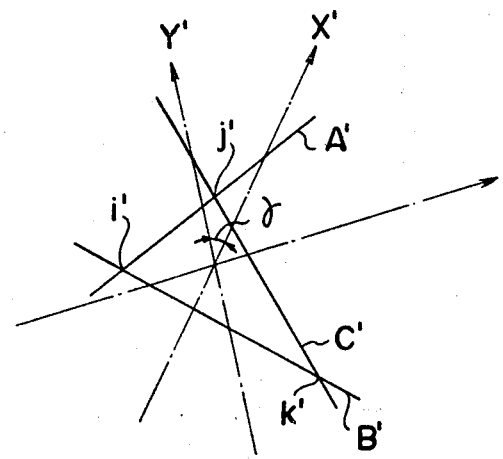
FIGS. 21 and 22 show the projected mask pattern with respect to obliquely intersecting coordinates.
Figure 22:
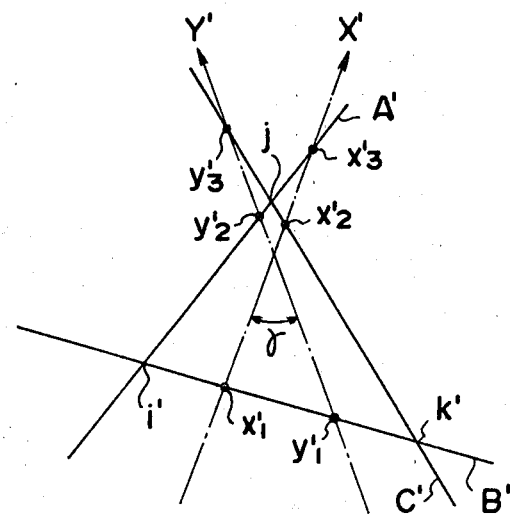
Figure 23:
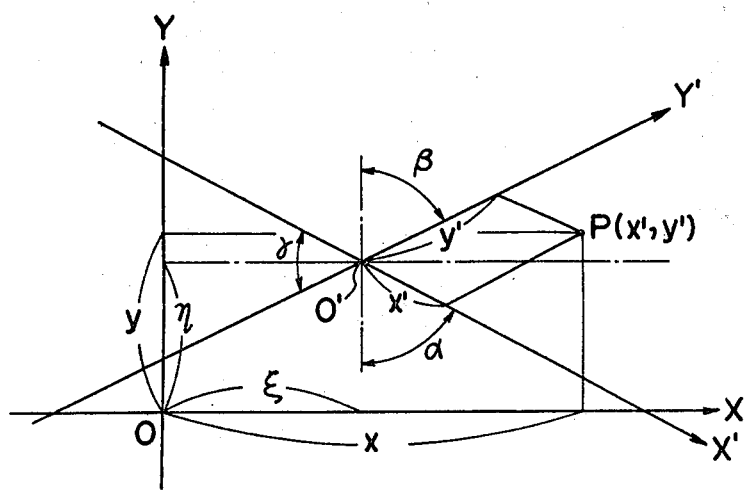
FIG. 23 is a diagram showing the relationship between perpendicular and oblique coordinates.

FIG. 21 shows an example wherein the detection is made along two obliquely intersecting lines X' and Y' which intersect each other with an angle $\gamma$. The projected lines A', B' and C' intersect with the X'-axis at points $x_1'$, $x_2'$ and $x_3'$ and with the Y'-axis at points $y_1'$, $y_2'$ and $y_3'$ as shown in FIG. 22. The locations of the points $x_3'$ and $y_2'$ determine the equation of the line A' whereas the locations of the points $x_1'$ and $y_1'$ and of the points $x_2'$ and $y_3'$ respectively determine the equations of the lines B' and C'.

Where the oblique coordinates X'-Y' on the detecting plane have a relationship with the perpendicular coordinates X-Y on the mask plane as shown in FIG. 23, conversions can be made in accordance with the following equations:

$$\left. \begin{array}{l} x = x' \sin \alpha + y' \sin \beta + \xi \\ y = -x' \cos \alpha + y' \cos \beta + \eta \end{array} \right\} \quad (11)$$

After such conversions, the previously discussed equations (1) through (7) can be applied to determine the optical characteristics of the test lens Ls. As an alternative procedure for calculating the refractive powers at the first and second axes of principal meridians $r_1$ and $r_2$, the mask pattern may at first be projected to the detecting plane without the test lens Ls to determine the initial value and then detection is made through a projection with the test lens. The difference between the the initial value and the result of the second detection can be used as the basis for the calculation of the refractive power of the lens. It will therefore be understood that, in the present invention, the linear sensor arrays can be arranged in any way irrespective of the X-Y coordinates in the mask plane.

Figure 25:
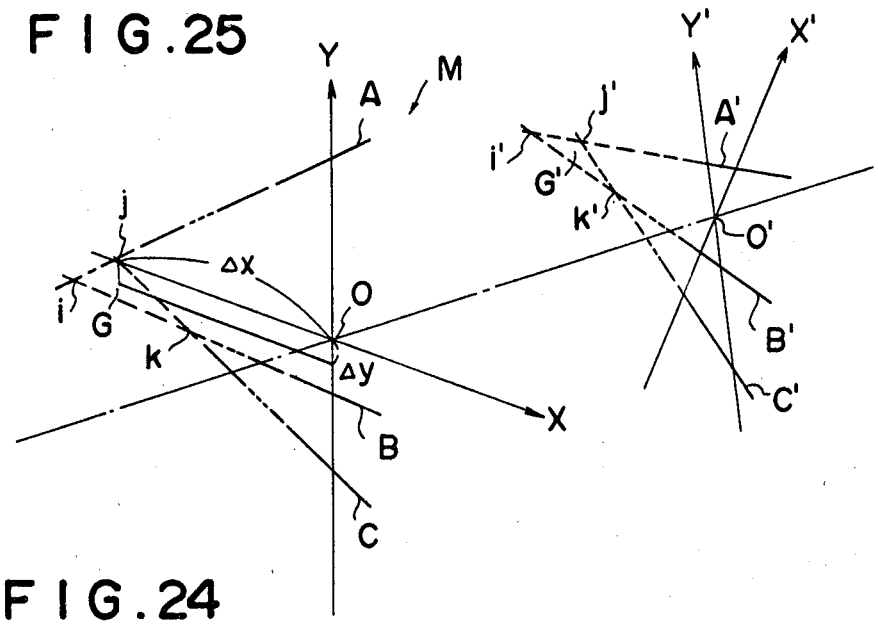
FIG. 25 is a perspective view showing another example of mask pattern having hypothetical intersections.
Figure 24:
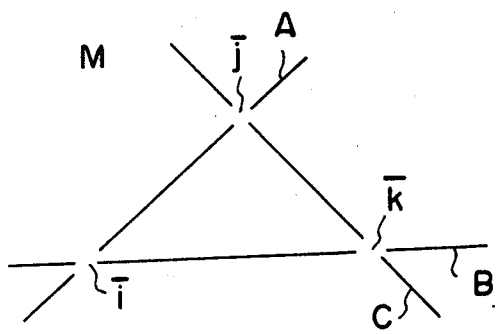
FIG. 24 shows an example of a mask pattern wherein the straight lines have only hypothetical intersections.
Figure 26:
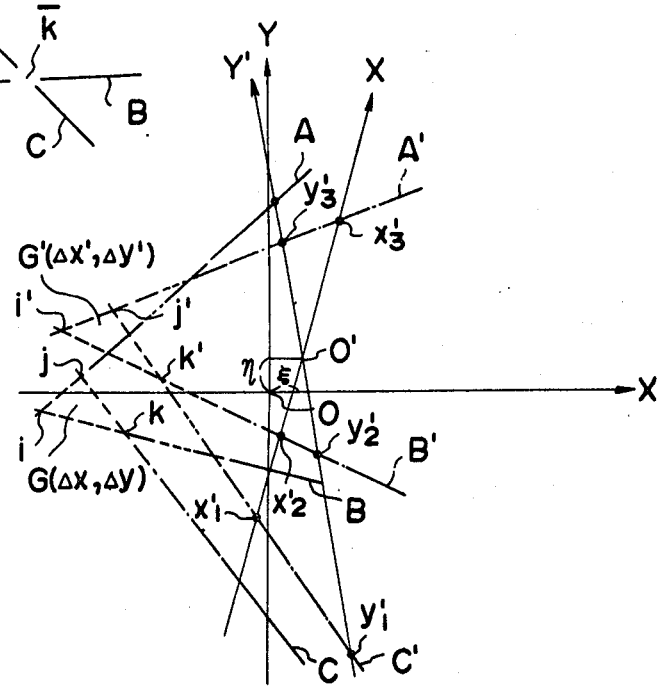
FIG. 26 is a front view of the mask pattern shown in FIG. 25.

The straight lines A, B and C on the mask M may not necessarily have actual intersections but may only have hypothetical intersections. For example, as shown in FIG. 24, the lines A, B and C may be interrupted at the intersections. In this instance, the hypothetical intersections $\overline{i}$, $\overline{j}$ and $\overline{k}$ may be calculated in the same manner as in the previous example on the basis of the formula of the straight lines. Further, as shown in FIG. 25, the lines A, B and C may not necessarily define an actual closed figure such as a triangle but extensions of the lines may form a triangle i-j-k or some other closed configuration. Referring to FIG. 26, the projected lines A', B' and C' intersect with the X'-axis at the points $x_1'$, $x_2'$ and $x_3'$ and with the y-axis at the points $y_1'$, $y_2'$ and $y_3'$ so that it is possible to determine the formula of the projected lines.

Figure 27:
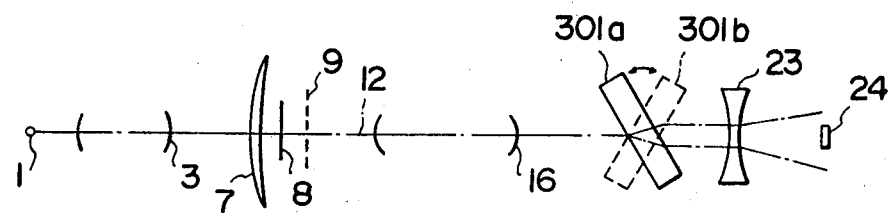
FIG. 27 is a diagrammatical side view of a lensmeter in accordance with a further embodiment of the present invention.
Figure 28:
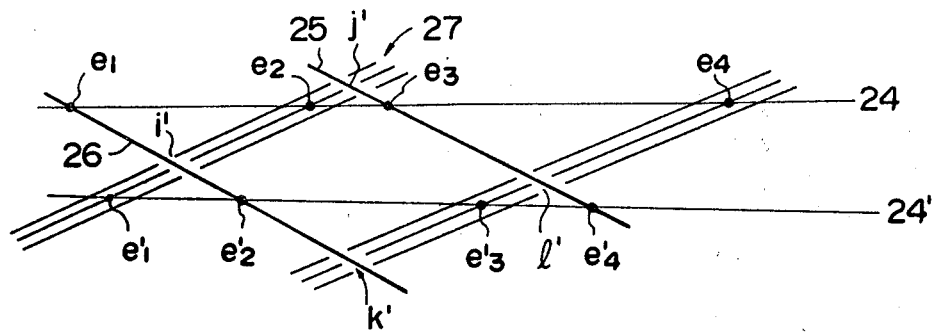
FIG. 28 shows a parallel displacement of a linear sensor array on a projected pattern.

Referring now to FIG. 27, there is shown an embodiment wherein the principle of FIG. 19 is adopted. In FIG. 27, corresponding parts are designated by the same reference numerals as in the previous embodiments. In this embodiment, a planar glass 301 and a negative lens 23 are disposed between the relay lens 16 and the linear sensor array 24. The planar glass 301 is inclined with respect to the optical axis 12 and movable between the position shown by solid lines 301(a) and the position shown by broken lines 301(b). Thus, the projected pattern can be parallelly shifted by moving the planar glass 301 between the aforementioned two positions. The projected pattern can therefore be detected along two parallel lines as shown by 24 and 24' in FIG. 28. Along the line 24, the points $e_1$, $e_2$, $e_3$ and $e_4$ are detected whereas the points $e_1'$, $e_2'$, $e_3'$ and $e_4'$ are detected along the line 24'.

Figure 29:
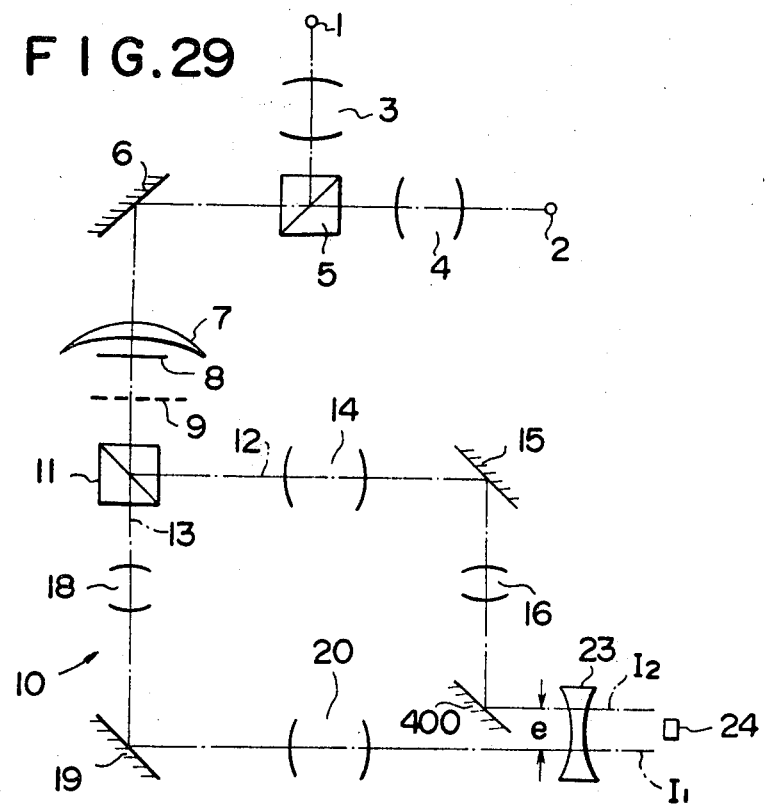
FIG. 29 is a diagrammatical view showing a further embodiment of the present invention.

FIG. 29 shows an embodiment similar to FIG. 3 but the beam splitter 17 in FIG. 3 is omitted and instead a mirror 400 is provided in such a manner that the light from the relay lens 20 is directly passed along an optical path $I_1$ through the negative lens 23 to the linear sensor array 24 whereas the light from the relay lens 16 is reflected by the mirror 400 toward the negative lens 23 to pass along an optical path $I_2$ to the sensor 24. The optical path $I_2$ is parallel with the optical path $I_1$ but spaced therefrom by a distance e.

Figure 30A:
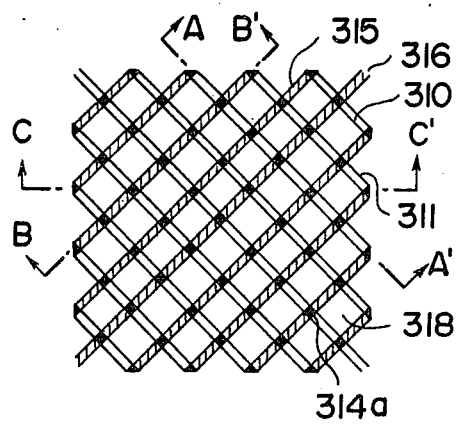
Figure 30B:
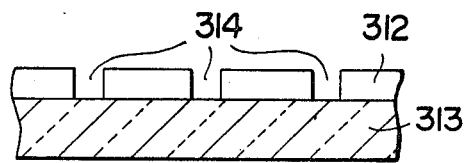
Figure 30C:
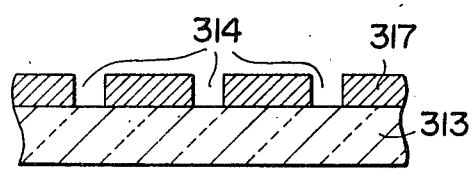
Figure 30D:
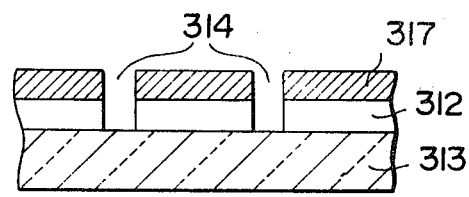
Figure 30E:
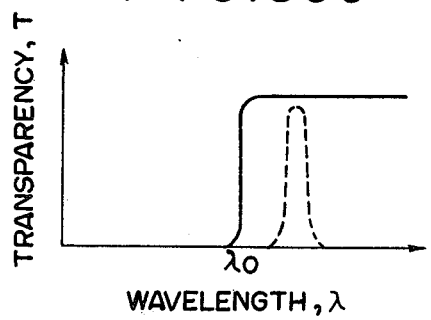
Figure 30F:
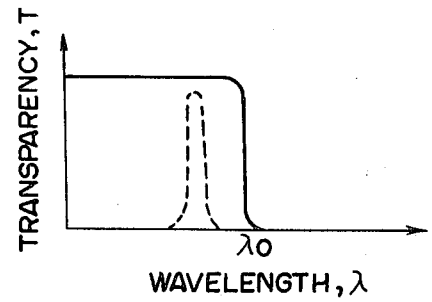

FIGS. 30(a) through (f) show an example of mask pattern which may be adopted in the present invention. As shown in FIG. 30b, a plurality of bands 312 of coatings are formed on a transparent substrate 313 with a spacing 314 between each two bands 312. As shown in FIG. 30e, the bands 312 of coatings transmit the light having wavelength greater than $\lambda_o$. Similarly, a plurality of bands 317 of coatings are formed on the substrate 313 with a spacing 314 between each two bands 317 as shown in FIG. 30c. The bands 317 of coatings transmit the light having wavelength smaller than $\lambda_o$ as shown in FIG. 30f. The bands 312 and 317 are arranged so that they cross perpendicularly with each other as shown in FIG. 30a. Thus, where the bands 312 and 317 cross each other, the two coatings are overlapped as shown in FIG. 30d to thereby provide opaque areas 318. In the spacings 314 between the bands 317, the coatings of the bands 312 are laid as shown by 310 and 311 in FIG. 30a. In the spacings 314 between the bands 312, the coatings of the bands 317 are laid as shown by 315 and 316 in FIG. 30a. Where the spacings 314 between the bands 312 cross the spacings 314 between the bands 317, there are formed uncoated transparent areas 314a. In the area 314a, there may be provided a coating of transparent refractive material if necessary for adjusting the length of optical path.

The above described mask may be used with a system similar to FIG. 16 except that two non-rotatable linear sensor arrays 24 and two light sources of different wavelengths are provided. Such a system is shown in FIG. 31. FIG. 32 shows an example of the projection of the mask pattern. The light from the diode 1 is passed through the coatings 310 and 311 on the mask to form images 310' and 311'. The light from the diode 2 is passed, on the other hand, through the coatings 315 and 316 on the mask and produces images 315' and 316'. The linear sensor arrays 24 are provided along the axes X' and Y' to detect the points $x_1'$ through $x_4'$ and $y_1'$ through $y_4'$, respectively. The optical characteristics can be calculated in the same manner as in the previous embodiments. The embodiment is advantageous in that it is not required to distinguish the pattern lines in a geometrical manner, and it is therefore possible to provide an increased number of lines without having adverse effects of diffraction.

FIGS. 33 and 34 show examples wherein the straight lines of the mask pattern are not sufficiently long to form actual intersections. In these instances, sufficient informations can be obtained by four linear sensor arrays as shown by $S_1$, $S_2$, $S_3$ and $S_4$.

The invention has thus been shown and described with reference to specific examples, however, it should be noted that the invention is in no way limited to the details of the illustrated arrangements, but changes and modifications may be made without departing from the scope of the appended claims.

I claim:

1. An apparatus for measuring optical characteristics of an optical system, said apparatus comprising: light source means for projecting a bundle of rays to said optical system; collimator means located between the light source means and the optical system for providing a parallel pencil of rays from said bundle of rays; mask means located behind the optical system for selectively passing the rays which have passed through the optical system; detecting means spaced apart from said mask means by a predetermined distance along the optical axis of said apparatus; operation means for operating on information received from said detecting means to determine the optical characteristics of the optical system; said mask means having a pattern thereon comprised of at least two nonparallel straight lines, whereby changes in the lengths and gradient angles of projections of the straight lines of the mask means onto the detecting means are detected to determine the optical characteristics of the optical system.

2. The apparatus of claim 1 in which the pattern on said mask means includes at least three nonparallel lines which intersect with each other, or in which hypothetical extensions thereof intersect with each other, at least at three points.

3. The apparatus of claim 2 in which said pattern on the mask means includes a pair of parallel sets of a plurality of straight lines and a pair of parallel straight lines intersecting perpendicularly with said pair of parallel sets of a plurality of straight lines.

4. The apparatus of claim 3 in which said pair of parallel sets of a plurality of straight lines and said pair of parallel straight lines do not actually overlap one another.

5. The apparatus of claim 2 in which said detecting means includes at least two non-parallel intersecting linear sensor arrays arranged in a plane perpendicular to the optical axis.

6. The apparatus of claim 2 in which said detecting means includes at least two parallel linear sensors arrays arranged in a plane perpendicular to the optical axis.

7. The apparatus of claim 2 and further comprising: beam splitting means provided between said mask means and said detecting means for dividing said bundle of rays into at least two optical paths which lead to said detecting means, and wherein said detecting means includes at least one linear sensor array, and wherein one of said optical paths is provided with image rotating means for rotating an image of said mask means by a predetermined angle so that the linear sensor array can detect the image along at least two intersecting axes.

8. The apparatus of claim 7 in which said light source means includes two light emitting elements producing lights of different wavelengths, and wherein said beam splitting means has a wavelength selective property so that the light of one wavelength is passed to one of said optical paths and the light of the other wavelength is passed to the other of said optical paths, and wherein means are provided for alternately switching on the light emitting elements between each successive scan of the linear sensor array.

9. The apparatus of claim 2 and further comprising: beam splitting means provided between said mask means and said detecting means for dividing said bundle of rays into at least two optical paths which lead to said detecting means, and wherein said detecting means includes at least one linear sensor array, and wherein one of said optical paths is provided with image shifting means for shifing an image of said mask means so that it is parallel to its unshifted orientation and the linear sensor array can detect the image along at least two parallel axes.

10. The apparatus of claim 9 in which said light source means includes two light emitting elements producing lights of different wavelengths, and wherein said beam splitting means has a wavelength selective property so that the light of one wavelength is passed to one of said optical paths and the light of the other wavelength is passed to the other of said optical paths, and wherein means are provided for alternately switching on the light emitting elements between each successive scan of the linear sensor array.

11. The apparatus of claim 1 in which the pattern in the mask means includes straight lines which are respectively transmissive to light of different wavelengths.

12. The apparatus of claim 1 in which said detecting means includes at least one linear sensor array rotatable in a plane perpendicular to said optical axis.

13. The apparatus of with claim 1 in which said detecting means includes at least one linear sensor array, which array is displaceable so that it is parallel to its undisplaced orientation in a plane perpendicular to said optical axis.

14. The apparatus of claim 1 and further comprising image rotating means provided between said mask means and said detecting means for rotating an image of said mask means about the optical axis.

15. The apparatus of claim 1 and further comprising image shifting means provided between the mask means and said detecting means for shifting an image of said mask means in a plane perpendicular to the optical axis.

16. The apparatus of claim 15 in which said image shifting means comprises means for shifting said image of said mask means without rotating said image of said mask means.

17. The apparatus of claim 1 in which said detecting means is a two-dimensional sensor arranged perpendicularly to the optical axis.

18. The apparatus of claim 1 in which said operating means includes first calculating means for calculating the coefficients of the equations of the projections of the straight lines in accordance with information from the detecting means, and second calculating means for calculating the locations of the intersections of the projections of the straight lines in accordance with the equations thereof.

19. The apparatus of claim 18 in which said operating means further includes a first operating section for obtaining the lengths of the projections of the straight lines based on information from the second calculating means, a second operating section for obtaining the gradients of the projections of the straight lines from the equations thereof, and a third operating section for obtaining the optical characteristics of the optical system.

20. An apparatus for measuring optical characteristics of an optical system, said apparatus comprising: light source means for projecting a bundle of rays to said optical system; collimator means located between the light source means and the optical system for providing a parallel pencil of rays from said bundle of rays; mask means, located behind the optical system, for selectively passing the rays which have passed through the optical system; detecting means spaced apart from said mask means by a predetermined distance along the optical axis of said apparatus; operation means for operating on information received from said detecting means so as to determine the optical characteristics of the optical system; said mask means having a pattern comprised of at least three straight lines which are arranged so that either they intersect, or hypothetical extensions of them intersect, with each other; said detecting means including a single linear sensor array perpendicular to said optical axis; and wherein beam splitting means are provided between said mask means and said linear sensor array for dividing said bundle of rays into two optical paths which lead to said linear sensor array; and wherein one of said optical paths is provided with image rotating means for rotating an image of said mask means by 90° so that the linear sensor array can detect the image along two perpendicular axes.

21. The apparatus of claim 20 in which said light source means includes two light emitting elements producing lights of different wavelengths, and wherein said beam splitting means has a wavelength selective property so that the light of one wavelength is passed to one of said optical paths and the light of the other wavelength is passed to the other of said optical paths, and wherein means are provided for alternately switching on the light emitting elements between each successive scan of the linear sensor array.

22. The apparatus of claim 20 in which said pattern on the mask means includes a pair of parallel sets of a plurality of straight lines and a pair of straight lines intersecting perpendicularly with said pair of parallel sets of a plurality of straight lines.

23. The apparatus of claim 22 in which said pair of parallel sets of a plurality of straight lines and said pair of parallel straight lines do not actually overlap one another.

24. The apparatus of claim 20 in which said operating means includes first calculating means for calculating the coefficients of the equations of the projections of the straight lines in accordance with information from the detecting means, and second calculating means for calculating the locations of the intersections of the projections of the straight lines in accordance with the equations thereof.

25. The apparatus of claim 24 in which said operating means further includes a first operating section for obtaining the lengths of the projections of the straight lines based on information from the second calculating means, a second operating section for obtaining the gradients of the projections of the straight lines from the equations thereof, and a third operating section for obtaining the optical characteristics of the optical system.

26. A method for measuring optical characteristics of an optical system comprising the steps of: providing a parallel bundle of rays; passing said parallel bundle of rays through said optical system; passing said parallel bundle of rays from the optical system through mask means having at least two non-parallel straight lines thereon to provide a projection of said pattern onto a detecting means; detecting said projection of the pattern by said detecting means which is located apart from said mask means by a predetermined distance along a measuring optical axis to thereby obtain changes in the lengths of the lines in the projection of the pattern; and determining the optical characteristics of the optical system through an operation based on the changes in the lengths of the lines in the projection of the pattern.

27. The method of claim 26 in which said operation step includes a first calculating step for calculating the coefficients of the equations of the lines in said projection of the pattern in accordance with information from results of the detection step, a second calculating step for calculating the locations of the intersections of the lines in said projection of the pattern in accordance with the equations thereof, a first operating step for obtaining the lengths of the lines in said projection of the pattern based on the information obtained at the second calculating step, a second operating step for obtaining the gradients of the lines in said projection of the pattern from the equations thereof, and a third operating step for obtaining the optical characteristics of the optical system.

28. A method for measuring optical characteristics of an optical system comprising the steps of: providing a parallel bundle of rays; passing said parallel bundle of rays through the optical system; passing said parallel bundle of rays from the optical system through mask means having at least three straight lines thereon, which lines intersect, or whose hypothetical extensions intersect, at least at three points, in order to provide a projection of said pattern; dividing said parallel bundle of rays from the mask means into two optical paths; directing one of said optical paths to at least one linear sensor array which is perpendicular to a measuring optical axis; directing the other of said optical paths to said linear sensor array through image rotating means for rotating said projection of the pattern by a predetermined angle so that said projection of the pattern is detected by the linear sensor array to thereby obtain changes in the lengths and intersection angles of the lines in said projection of the pattern; and determining, through operations, the optical characteristics of the optical system on the basis of said changes.

29. The method of claim 28 in which first and second light sources are provided for producing light beams of different wavelengths, and wherein the light beam from said first light source is directed along one of the optical paths and the light beam from said second light source is directed along the other optical path.

* * * * *